(12) United States Patent
Phelps et al.

(10) Patent No.: US 11,313,471 B2
(45) Date of Patent: Apr. 26, 2022

(54) SHROUDED AIRCRAFT ENGINE SEAL CARRIER

(71) Applicant: Raytheon Technologies Corporation, Farmington, CT (US)

(72) Inventors: Joseph B. Phelps, Vernon, CT (US); Sean P. McGee, Andover, CT (US); Joseph G. Colucci, Milford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 95 days.

(21) Appl. No.: 16/866,633

(22) Filed: May 5, 2020

(65) Prior Publication Data

US 2021/0348563 A1 Nov. 11, 2021

(51) Int. Cl.
*F16J 15/36* (2006.01)
*F01D 25/18* (2006.01)

(52) U.S. Cl.
CPC .......... *F16J 15/363* (2013.01); *F01D 25/183* (2013.01); *F05D 2260/36* (2013.01); *F05D 2260/38* (2013.01)

(58) Field of Classification Search
CPC .. F16J 15/363; F02C 7/28; F01D 25/183–186
USPC ........................................................ 277/392
See application file for complete search history.

(56) References Cited

U.S. PATENT DOCUMENTS

| 3,129,983 A * | 4/1964 | May ........................ F01D 25/18 384/130 |
| 3,288,474 A * | 11/1966 | Gits ........................ F16J 15/363 277/391 |
| 4,365,816 A | 12/1982 | Johnson et al. |
| 4,453,722 A * | 6/1984 | Swanson ................. F16J 15/008 277/372 |
| 5,370,427 A * | 12/1994 | Hoelle .................... F16L 27/11 285/226 |
| 6,311,983 B1 * | 11/2001 | Burcham ............... F16J 15/002 277/370 |

(Continued)

FOREIGN PATENT DOCUMENTS

| CN | 107975600 A | * | 5/2018 |
| CN | 110131200 A | * | 8/2019 |

(Continued)

OTHER PUBLICATIONS

EPO Search Opinion in corresponding Application 21172338.2 dated Sep. 28, 2021 (Year: 2021).*

(Continued)

*Primary Examiner* — Topaz L. Elliott
(74) *Attorney, Agent, or Firm* — Carlson, Gaskey & Olds, P.C.

(57) ABSTRACT

A seal configuration for an aircraft engine includes a ring shaped sealing component defining an axis. A carrier is disposed radially outward of the ring shaped sealing component and supports the ring shaped sealing component. A housing includes a shroud portion. The shroud portion fully surrounds the carrier and is maintained in a static position relative to the carrier via a bellows spring and a plurality of rotation inhibiting features. Each rotation inhibiting feature in the plurality of rotation inhibiting features includes a tab protruding radially outward from the carrier and received in a slot intruding into the shroud portion.

17 Claims, 3 Drawing Sheets

(56) References Cited

U.S. PATENT DOCUMENTS

| | | | |
|---|---|---|---|
| 9,239,117 B1 | 1/2016 | Craig et al. | |
| 9,291,269 B2 | 3/2016 | Jahn et al. | |
| 9,394,799 B1 * | 7/2016 | Mills | F16J 15/3448 |
| 9,879,784 B2 | 1/2018 | Kirkhope et al. | |
| 9,890,650 B2 | 2/2018 | Von Berg et al. | |
| 10,024,241 B2 | 7/2018 | Miller et al. | |
| 10,563,772 B2 | 2/2020 | Trivedi et al. | |
| 2005/0194746 A1 * | 9/2005 | Grace | F16J 15/38 277/358 |
| 2015/0337674 A1 * | 11/2015 | Sonokawa | F16J 15/3472 415/173.3 |
| 2016/0025013 A1 * | 1/2016 | Miller | F01D 25/186 60/805 |
| 2017/0268360 A1 * | 9/2017 | De La Bruere Terreault | F01D 11/003 |
| 2018/0306044 A1 * | 10/2018 | Witlicki | F01D 25/162 |
| 2019/0249605 A1 | 8/2019 | Amador et al. | |
| 2021/0172528 A1 * | 6/2021 | Rugged | F16J 15/3404 |

FOREIGN PATENT DOCUMENTS

| | | | | |
|---|---|---|---|---|
| EP | 3524783 | | 8/2019 | |
| EP | 3524783 A1 * | 8/2019 | | F04D 29/644 |
| FR | 2685425 A1 * | 6/1993 | | F16J 15/3404 |
| JP | H0681964 A * | 3/1994 | | F16J 15/3404 |

OTHER PUBLICATIONS

European Search Report for Application No. 21172338.2 completed on Sep. 15, 2021.

* cited by examiner

SHROUDED AIRCRAFT ENGINE SEAL CARRIER

TECHNICAL FIELD SHROUD

The present disclosure relates generally to aircraft engine seals, and more particularly to a shrouded aircraft engine seal.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Included within the gas turbine engine at multiple locations, such as at bearing supports, are multiple engine seals. Some such seals are carbon seals and include a stationary sealing component in contact with an adjacent rotating component. In certain failure modes, portions of the seal housing that maintain the seal in a stationary state can become disconnected resulting in a system where rotation of the adjacent component can be translated to the seal element, resulting in the seal element being driven to rotate. While certain sealing configurations are resistant to this undesirable rotation, failure modes in which the rotation can occur remain possible.

SUMMARY OF THE INVENTION

In one exemplary embodiment a seal configuration for an aircraft engine includes a ring shaped sealing component defining an axis, a carrier disposed radially outward of the ring shaped sealing component and supporting the ring shaped sealing component, a housing including a shroud portion, the shroud portion fully surrounding the carrier, wherein the housing is maintained in a static position relative to the carrier via a bellows spring, and a plurality of rotation inhibiting features, each rotation inhibiting feature in the plurality of rotation inhibiting features including a tab protruding radially outward from the carrier and received in a slot intruding into the shroud portion.

In another example of the above described seal configuration for an aircraft engine the plurality of rotation inhibiting features are disposed in a radially balanced configuration.

In another example of any of the above described seal configurations for an aircraft engine each tab is positioned at an axial end of the carrier.

In another example of any of the above described seal configurations the axial end of the carrier is an axial end nearest the bellows spring.

In another example of any of the above described seal configurations the tab is maintained out of contact with slot surfaces while the seal configuration is in a non-failed state.

In another example of any of the above described seal configurations the plurality of rotation inhibiting features includes at least three rotation inhibiting features.

In another example of any of the above described seal configurations the plurality of rotation inhibiting features includes at least four rotation inhibiting features.

In another example of any of the above described seal configurations the ring shaped sealing component includes an axial protrusion at a first axial end of the ring shaped sealing component.

In another example of any of the above described seal configurations the axial protrusion extends beyond an axial end of the shroud portion.

In another example of any of the above described seal configurations each slot has an axial length such that the corresponding tab is out of contact with an axial end of the slot while the bellows spring is in a fully compressed state.

In one exemplary embodiment a gas turbine engine includes a compressor section, a combustor section fluidly connected to the compressor section, and a turbine section fluidly connected to the combustor section, and a plurality of seals disposed within the gas turbine engine. Each of the seals including: a ring shaped sealing component defining an axis, a carrier disposed radially outward of the ring shaped sealing component and supporting the ring shaped sealing component, a housing including a shroud portion, the shroud portion fully surrounding the carrier, wherein the housing is maintained in a static position relative to the carrier via a bellows spring, and a plurality of rotation inhibiting features, each rotation inhibiting feature in the plurality of rotation inhibiting features including a tab protruding radially outward from the carrier and received in a slot intruding into the shroud portion.

In another example of the above described gas turbine engine at least one of the seals in the plurality of seals is disposed proximate a bearing.

In another example of any of the above described gas turbine engines the plurality of rotation inhibiting features are disposed in a radially balanced configuration.

In another example of any of the above described gas turbine engines the plurality of rotation inhibiting features includes from two to four rotation inhibiting features.

An exemplary method for preventing rotation of a seal element includes allowing at least a portion of a carrier to rotate until a radially outward protruding tab of the carrier contacts a shroud and preventing continued rotation of the seal element via interfacing a tab protruding radially outward from the carrier a slot wall of the shroud.

In another example of the above described method for preventing rotation of a seal element interfacing the tab and the slot wall comprises using the slot wall to oppose circumferential rotation of the tab.

Another example of the above described method for preventing rotation of a seal element further includes preventing contact between the tab and the shroud while a bellows spring is in a non-failed state.

These and other features of the present invention can be best understood from the following specification and drawings, the following of which is a brief description.

DETAILED DESCRIPTION OF AN EMBODIMENT

Figure 1:
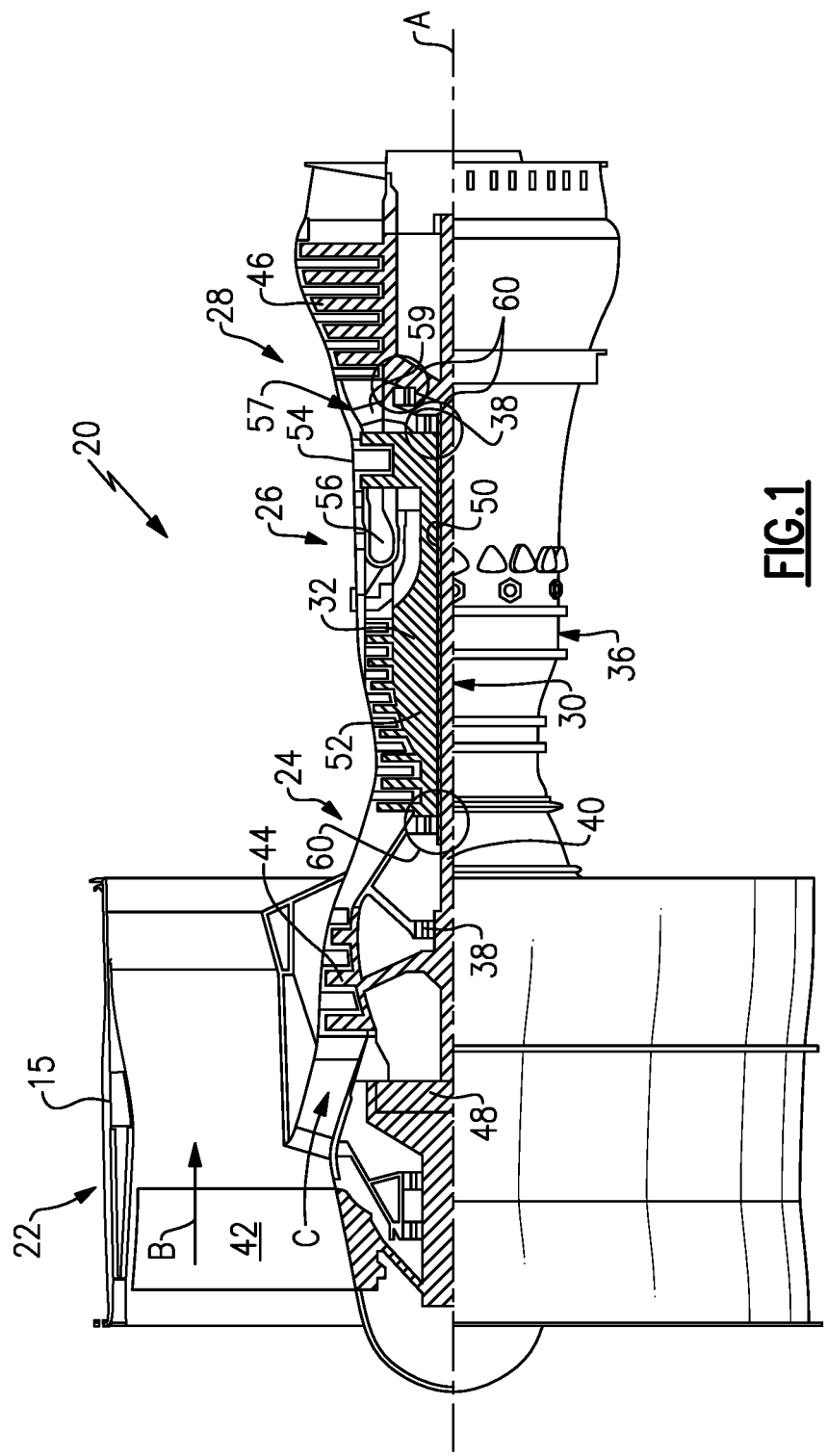
FIG. 1 illustrates a high level schematic view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{-0.5}$. The "Low corrected fan tip speed" as disclosed herein according to one non-limiting embodiment is less than about 1150 ft/second (350.5 meters/second).

Included within the engine 20 are multiple seal locations 60 at or near the engine bearings. Each of the seal locations 60 includes a stationary carbon seal disposed against an adjacent rotating engine part. While illustrated at three locations in the exemplary engine 20 of FIG. 1, one of skill in the art will appreciate that the number, and location, of the carbon seals will vary depending on the specific configuration of the given engine according to the needs of the engine.

Some carbon seal designs utilize a bellows spring configuration to apply an axial load to the carbon seal face, thereby maintaining a sealing element in a stationary position relative to the rotating component contacting the sealing element. Due to vibrations induced by engine operations, or other external occurrences, the bellows spring can be excited and fail. When such a failure occurs, it is possible for the failure to occur at the weld points, resulting in a portion of the bellows spring becoming decoupled from the seal housing. The decoupling allows the decoupled portion of the bellows spring and the corresponding seal element to rotate along with the adjacent component. Such a rotation is undesirable and can result in a loss of centering of the seal element, damage to the seal element, the seal carrier, and further damage to the bellows spring, debris entering the sealed compartment and placing other hardware at risk, as well as potentially allowing oil to pass through the seal and contaminating an adjacent area.

Additionally, elevated or unanticipated inputs from the system, such as unexpected vibrations and jerks, can cause high stresses within the bellows spring itself. If left uncontrolled, these issues can lead to excessive carbon seal wear or bellows fracture. This can, in turn, result in a loss of compartment sealing capability, damage to surrounding engine hardware, and other potential issues for the system.

Figure 2:
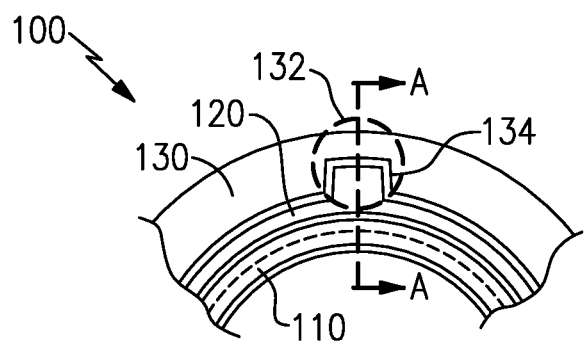
FIG. 2 schematically illustrates a partial axial end view of an exemplary seal configuration.
Figure 3:
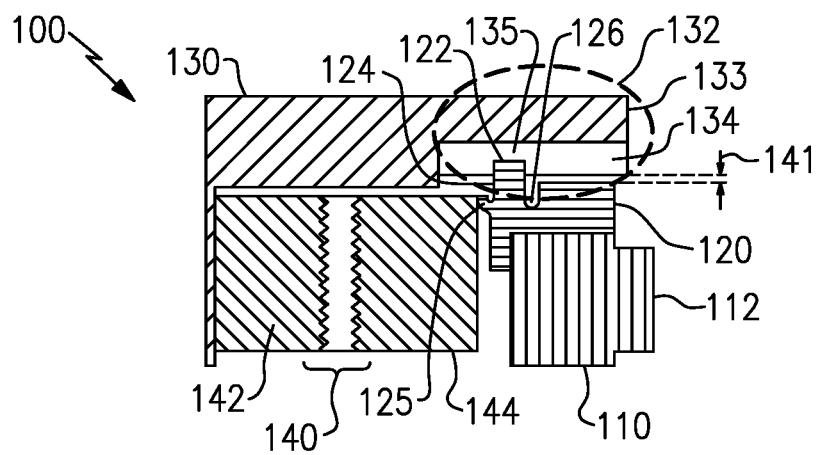
FIG. 3 schematically illustrates a cross sectional view along cross section A-A of the exemplary seal configuration of FIG. 2.

With continued reference to FIG. 1, FIG. 2 schematically illustrates an axial end partial view of an exemplary seal configuration 100. FIG. 3 schematically illustrates a cross sectional view along cross section A-A of the exemplary seal configuration 100 of FIG. 2. The seal configuration 100 includes a ring shaped seal element 110. As used herein, reference to the "axis" and "radius" refers to an axis and a radius defined by the ring shaped element 110. The ring shaped seal element 110 can, in some examples, be a carbon seal. The ring shaped seal element 110 is mounted within a carrier 120. A housing 130 is disposed radially outward of the carrier 120, and is maintained in position relative to an engine static structure via any known static housing connection. The housing 130 is coupled to the carrier 120 via a bellows spring 140 (hidden in FIG. 2, visible in FIG. 3). Also included in the housing 130 is a shroud portion 132. The shroud portion 132 is radially outward of, and radially surrounds, the carrier 120 and a majority of the seal element 110 with an axial extension 112 of the seal element 110 extending axially beyond an axial end 133 of the shroud portion 132.

In situations where the bellows spring 140 encounters a failure mode, a first portion 142 of the bellows spring 140 can be decoupled from a second portion 144 of the bellows spring 140, allowing the second portion 144, and thus the carrier 120 and the seal element 110, to rotate about the axis. The illustrated bellows spring 140 of FIG. 3 is depicted in such a failure mode. Further, while the illustrated failure mode includes a second portion 144 decoupled from a first portion 142, the features further described herein can be applicable to any failure mode that would allow the carrier 120 and the seal element 110 to rotate about the axis.

In order to prevent the undesirable rotation, and thus minimize the negative impact of the failure mode, the seal configuration 100 includes a slot 134 in the shroud 132 portion of the housing 130. The slot 134 is a radial intrusion into the shroud portion 132 and has an axial length such that the tab is maintained out of contact with an axial end of the slot 134 while the bellows spring 140 is in a fully compressed state. Received in the slot 134 is a radially outward extending protrusion 122 of the carrier 120. In the example of FIGS. 2 and 3, the radially outward extending protrusion is disposed at an axial end 124 of the carrier 120. A gap 141 is defined between a radially outward facing surface of the carrier 120 and a radially inward facing surface of the shroud portion 132. The gap 141 is a tightly controlled gap, thereby further maintaining performance of the shrouded seal. During operation of the engine including the seal configuration 100, the radial gap 141 operates as an enclosure to entrap viscous fluid around the bellows spring 140, and as a radial pilot/deflection limiter.

The radially outward protrusion 122 (alternately referred to as a tab) is received in the slot 134 without contacting the interior walls of the slot 134 during normal operations of the seal configuration 100. In the event of the bellows breakage (such as the breakage illustrated in FIG. 3), the carrier 120 rotates slightly until the radially outward protrusion 122 contacts a side surface 135 of the slot 134.

Figure 5:
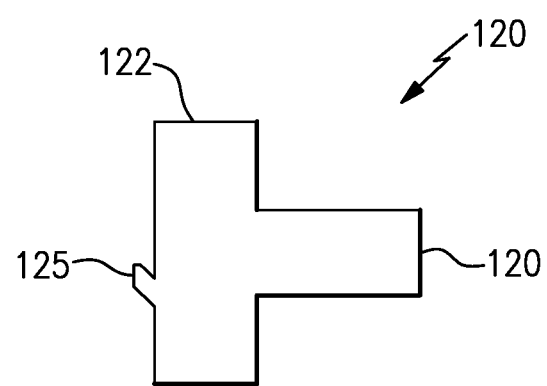
FIG. 5 schematically illustrates an alternative example seal carrier for utilization in the seal configuration of FIGS. 2 and 3.

Axially adjacent to the radial protrusion 122 is a radial intrusion 126. The radial intrusion intrudes into the seal carrier 120. The intrusion assists in manufacturing of the seal carrier 120. In alternative examples, such as the alternative example of FIG. 5, the radial intrusion 126 can be omitted and the radially outward facing surface of the seal carrier is uninterrupted from the radial protrusion 122 to the axial end opposite the radial protrusion 122. Also included on the carrier 120 is an interface tab 125. The interface tab 125 interfaces the carrier 120 with the bellows spring 140.

By integrating the anti-rotation features of the carbon seal carrier 120 (the radially outward protrusion 122 and the slot 134), and a radially outward shroud portion 132 surrounding the carbon seal 110, the seal configuration 100 is able to prevent rotation of the carbon seal 110 in the event of a bellows fracture. In addition, the shrouded portion 132 provides a circumferentially controlled radial gap 141 that limits movement of the carbon carrier 120 composite and prevents the progression of unstable dynamic modes, which have been shown to contribute to bellows failure and carbon damage. In addition, the shroud portion 132 provides viscous damping to the overall seal configuration 100 without substantially impacting the sealing performance.

Figure 4A:
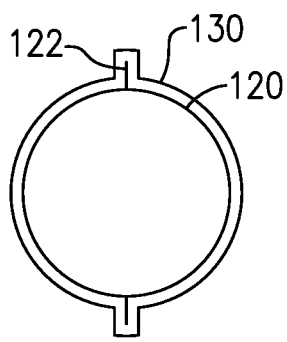
FIG. 4A illustrates a highly schematic seal carrier configuration including a first example arrangement of anti-rotation features.
Figure 4B:
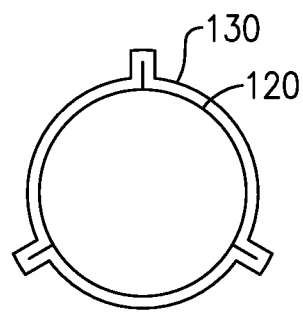
FIG. 4B illustrates a highly schematic seal carrier configuration including a second example arrangement of anti-rotation features.
Figure 4C:
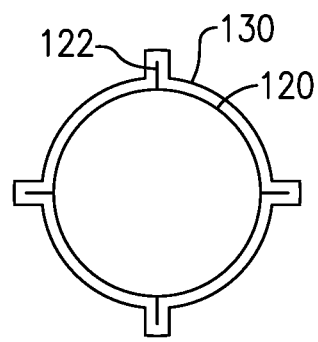
FIG. 4C illustrates a highly schematic seal carrier configuration including a third example arrangement of anti-rotation features.

With continued reference to the seal configuration 100 of FIGS. 2 and 3, it is appreciated that in some examples, the radial protrusions 122, and corresponding slots 134 are evenly distributed around the circumference of the carbon seal 110. FIGS. 4A, 4B, and 4C illustrate highly schematic views of the carrier 120 and the housing 130. In the example of FIG. 4A, the carrier 120 includes two radially outward protrusions 122. In the example of FIG. 4B, the carrier 120 includes three radially outward protrusions 122. In the example of FIG. 4C, the carrier 120 includes four radially outward protrusions 122. It is appreciated that in alternative examples, alternative numbers of circumferentially evenly distributed radially outward protrusions and slots can be utilized to similar effect and are within the bounds of this disclosure.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A seal configuration for an aircraft engine comprising:
   a ring shaped sealing component defining an axis;
   a carrier disposed radially outward of the ring shaped sealing component and supporting the ring shaped sealing component;
   a housing including a shroud portion, the shroud portion fully surrounding the carrier, wherein the housing is maintained in a static position relative to the carrier via a bellows spring; and
   a plurality of rotation inhibiting features, each rotation inhibiting feature in the plurality of rotation inhibiting features including a tab protruding radially outward from the carrier and received in a slot intruding into the shroud portion, each of the tabs being maintained out of contact with surfaces of the slot receiving the tab while the seal configuration is in a non-failed state.

2. The seal configuration of claim 1, wherein the plurality of rotation inhibiting features are disposed in a rotationally balanced configuration.

3. The seal configuration of claim 1, wherein each tab is positioned at an axial end of the carrier.

4. The seal configuration of claim 3, wherein the axial end of the carrier is an axial end nearest the bellows spring.

5. The seal configuration of claim 1, wherein the plurality of rotation inhibiting features includes at least three rotation inhibiting features.

6. The seal configuration of claim 5, wherein the plurality of rotation inhibiting features includes at least four rotation inhibiting features.

7. The seal configuration of claim 1, wherein the ring shaped sealing component includes an axial protrusion at a first axial end of the ring shaped sealing component.

8. The seal configuration of claim 7, wherein the axial protrusion extends beyond an axial end of the shroud portion.

9. The seal configuration of claim 1, wherein each slot has an axial length such that the corresponding tab is out of contact with an axial end of the slot while the bellows spring is in a fully compressed state.

10. A gas turbine engine comprising:
a compressor section, a combustor section fluidly connected to the compressor section, and a turbine section fluidly connected to the combustor section; and
a plurality of seals disposed within the gas turbine engine, each of the seals including:
a ring shaped sealing component defining an axis;
a carrier disposed radially outward of the ring shaped sealing component and supporting the ring shaped sealing component;
a housing including a shroud portion, the shroud portion fully surrounding the carrier, wherein the housing is maintained in a static position relative to the carrier via a bellows spring;
a plurality of rotation inhibiting features, each rotation inhibiting feature in the plurality of rotation inhibiting features including a tab protruding radially outward from the carrier and received in a slot intruding into the shroud portion such that a portion of the carrier is allowed to rotate until the tab contacts an edge of the slot when the bellows spring is in a failed state.

11. A method for preventing rotation of a seal element comprising:
allowing at least a portion of a carrier to rotate until a radially outward protruding tab of the carrier contacts a shroud in response to a bellows spring failure; and
preventing continued rotation of the seal element via interfacing a tab protruding radially outward from the carrier with a slot wall of the shroud.

12. A method for preventing rotation of a seal element comprising:
allowing at least a portion of a carrier to rotate until a radially outward protruding tab of the carrier contacts a shroud;
preventing continued rotation of the seal element via interfacing a tab protruding radially outward from the carrier a slot wall of the shroud; and
preventing contact between the tab and the shroud while a bellows spring is in a non-failed state.

13. The method of claim 12, wherein interfacing the tab and the slot wall comprises using the slot wall to oppose circumferential rotation of the tab.

14. A gas turbine engine comprising:
a compressor section, a combustor section fluidly connected to the compressor section, and a turbine section fluidly connected to the combustor section; and
a plurality of seals disposed within the gas turbine engine, each of the seals including:
a ring shaped sealing component defining an axis;
a carrier disposed radially outward of the ring shaped sealing component and supporting the ring shaped sealing component;
a housing including a shroud portion, the shroud portion fully surrounding the carrier, wherein the housing is maintained in a static position relative to the carrier via a bellows spring;
a plurality of rotation inhibiting features, each rotation inhibiting feature in the plurality of rotation inhibiting features including a tab protruding radially outward from the carrier and received in a slot intruding into the shroud portion, each of the tabs being maintained out of contact with surfaces of the slot receiving the tab while the seal configuration is in a non-failed state.

15. The gas turbine engine of claim 14, wherein at least one of the seals in the plurality of seals is disposed at a bearing.

16. The gas turbine engine of claim 14, wherein the plurality of rotation inhibiting features are disposed in a rotationally balanced configuration.

17. The gas turbine engine of claim 16, wherein the plurality of rotation inhibiting features includes from two to four rotation inhibiting features.

* * * * *